United States Patent [19]

Yano et al.

[11] 4,436,380
[45] Mar. 13, 1984

[54] ELECTROCHROMIC DISPLAY DEVICE

[75] Inventors: Kohzo Yano, Yamatokoriyama; Hiroshi Hamada, Nara; Yasuhiko Inami, Nara; Tomio Wada, Nara, all of Japan

[73] Assignee: Sharp Kabushiki Kaisha, Osaka, Japan

[21] Appl. No.: 287,047

[22] Filed: Jul. 27, 1981

[30] Foreign Application Priority Data

Jul. 31, 1980 [JP] Japan ............................ 55-106885

[51] Int. Cl.³ .................................................. G02F 1/17
[52] U.S. Cl. .................................... 350/357; 29/570
[58] Field of Search .................. 350/357, 353, 355; 29/570

[56] References Cited

U.S. PATENT DOCUMENTS 3,827,784  8/1974  Giglia et al. ..................... 350/357

Primary Examiner—James W. Davie
Attorney, Agent, or Firm—Hubbell, Cohen, Stiefel & Gross

[57] ABSTRACT

An electrochromic display device in which the redox layer of the counter-electrode is formed by burning a mixture of a self-film-forming compound such as manganese nitrate and a carbon type electroconductive material such as non-woven fabric of carbon fibers without use of any binder.

20 Claims, 9 Drawing Figures

ELECTROCHROMIC DISPLAY DEVICE

BACKGROUND OF THE INVENTION

1. Field of the Invention

This invention relates to an electrochromic display device (hereinafter called "ECD") using a substance of which the optical absorption characteristic in the visible light region is reversibly varied by the application of electric current, and more particularly to a new counter-electrode for ECD which is disposed opposite a display electrode formed of an electrochromic substance.

2. Description of the Prior Art

FIG. 1 is a sectional view of one device of the prior art. On a transparent glass substrate 1 is formed a transparent electrode 2. On this transparent electrode 2 is provided a layer of an electrochromic substance 3 [such as a tungsten oxide ($WO_3$) film]. On the remaining part of the transparent electrode 2, an insulating film 4 is formed. A display electrode is composed of these component parts. The other transparent glass substrate 5 which is disposed opposite the glass substrate 1 is formed in the shape of a cap. On the inner wall surface of this glass substrate 5, a conductor 6 is formed by evaporation or spattering. On this conductor 6, a redox layer 7 is formed by evaporation or spattering. These component parts compose a counter-electrode. A white porous plate 8 is interposed between the redox layer 7 and the electrochromic layer 3. The substrates 1, 5 are fastened in position with an adhesive agent 9 in an airtight manner. The empty space enclosed with the substrates 1, 5 is filled with an electrolyte 10. This empty space retains a bubble and, therefore, absorbs possible thermal expansion of the electrolyte 10. Denoted by 12 is a non-woven fabric of glass fibers serving to keep the porous plate 8 in intimate contact with the display electrode.

When the ECD cell thus constructed is operated, since this cell is one type of electrolytic cell, exchange between ion conduction and electron conduction proceeds in both of the display electrode and the counter-electrode. The electrochemical reaction which occurs in the $WO_3$ film, for example, is known to proceed as shown below.

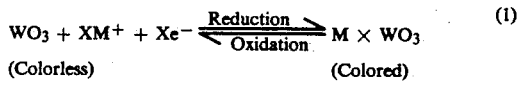

(Colorless)  (Colored)   (1)

$$WO_3 + XM^+ + Xe^- \underset{\text{Oxidation}}{\overset{\text{Reduction}}{\rightleftharpoons}} M \times WO_3$$

(wherein, X denotes a number in the range of 0 to 1 and M denotes a metal atom). In the operation of the ECD cell in which the electrochromic layer 3 of the display electrode and the redox layer 7 of the counter-electrode are both made of $WO_3$ film, the write operation of the display electrode corresponds to the reaction of reduction in the formula (1). In the meantime, the oxidation of the same formula proceeds in the counter-electrode. Mere specifically, where the $WO_3$ film used in the counter-electrode as an auxiliary electrode is caused to color (i.e., write operation), the oxidation in the formula (1) proceeds in the redox layer 7.

The data concerning the write operation are shown in FIG. 2 and the data concerning the erase operation are shown in FIG. 3. FIG. 2 and FIG. 3 represent the results of the experiment conducted on an ECD cell constructed as described above and possessed of a display area of 1.5 cm$^2$ and a counter-electrode (redox layer) surface area of 10 cm$^2$, by passing a fixed current of 20 mA/cell for 0.5 second (500 m. sec) through, or applying a charge of 10 mC/cell to, the ECD cell and noting the time course change in the potential of the counter-electrode. In the graphs, the continuous line represents the change of the potential and the broken line the change of the current. It is clear from the graphs that when the redox layer of the counter-electrode is formed of colored $WO_3$ film, the potential of the counter-electrode during the write operation of the cell by use of the fixed current shows the time-course change which is expected in view of the reaction formula (1). After the electrolysis, this potential gradually shifts to the equilibrium potential.

The results of another experiment conducted under the same conditions as those mentioned above on a freshly produced ECD cell or an ECD cell which had had the counter-electrode colored by the same method as described above and which thereafter had been preserved at a temperature of 60° C. for 24 hours are shown in FIG. 4 and FIG. 5. It is seen from FIG. 4 that the time-course change of the potential of the counter-electrode during the write operation of the ECD cell contains a point of refraction (A) and eventually reaches a fairly high level. This fact implies that the reaction after the point of refraction is different from the expected reaction (the erase reaction of the colored tungsten) indicated by the reaction formula (1). It is generally known that the oxidation number of the decolorized $WO_3$ is 6 and that the tungsten atom is not allowed to assume any higher oxidation number than 6. The reaction after the point of refraction, therefore, is inferred to be a reaction to decompose the electrolyte. The decomposition of the electrolyte is thought to induce breakage of the cell. For the ECD cell to provide the repeated display without fail, it is necessary that the cell should retain the color of the $WO_3$ film in the counter-electrode and enable the counter-electrode to retain its ability to generate the desirable reaction of oxidation.

Incidentally, it is well known that the extent of coloration of the $WO_3$ film (the amount of electric charge to be retained) is changed along the course of time. As described above, the extent of coloration of $WO_3$ is decreased at a rate of about 10% per hour at an elevated temperature of 60° C. and at a rate of about 10% per day at room temperature, and the speed of color erasure depends on the environmental conditions. The ECD cell which uses $WO_3$ in the redox (active substance) layer of the counter-electrode, therefore, inevitably requires a device of some sort or other capable of enabling the redox layer to retain its capacity for electric charge at a fixed level. Unfortunately, the speed of erasure of the $WO_3$ film when the film is left standing depends on the temperature. In the case of the display device, which for conventional applications is required to anticipate a wide variety of environments under which it is put to use, it is extremely difficult to retain the capacity for the electric charge at a fixed level under varying conditions.

Various systems claimed to satisfy simultaneously the properties expected of the counter-electrode, namely the ability to pass the electric current in both directions of oxidation and reduction (i.e., an ability to curb polarization) and the ability to retain the equilibrium potential at a fixed level, have been proposed. One proposal is to use an electrode which is molded of a mixture consisting of graphite, a binder, and an electrochromic substance (U.S. Pat. No. 3,827,784, Japanese Laid-open Patent Publication No. 13891/1972, and U.S. Pat. No. 3,978,007). In this proposal, many substances are disclosed as concrete examples of an electrochromic substance (substance capable of exhibiting the phenomenon of electrochromism). They are oxides of transition metals, halogenides, selenides, metal oxo-acid salts, etc. Other relevant proposals are those covering a shaped article molded of an iron complex and a carbon powder (Shigeo Kondo et al: Oct. 31, 1979 issue of Technical Report of Television Study Society, 7), a sintered article of a metal-carbon mixture (Hironosuke Ikeda and Kinya Tada: Electronics Materials, 1980 No. 2, 47), and a press-molded electrode using as an active substance a powdered oxide of transition metal such as manganese oxide and as a combination current collector and carrier an expanded graphite as disclosed by the applicant is his patent applications (Japanese Patent Application No. 168927/1979) (which does not use any binder). All the counter-electrodes covered by the proposals mentioned above are reported to exhibit outstanding properties with respect to the restraint of polarization and the stability of equilibrium potential. These counter-electrodes, however, have a disadvantage, in that because they are press molded, the processes for their manufacture are complicated and their prices are high and the works involved in establishing electric continuity between the electrode interiors and the external components gain in complexity.

Further, the method as disclosed e.g. by Japanese Laid-open Patent Publication No. 13891/1972, which produces a counter-electrode by mixing an active substance and graphite with a binder such as, for example, a thermosetting resin like an epoxy resin or an emulsified or dissolved polymer thereby preparing a paste, spreading this paste on a glass substrate, and subjecting the resultant composite to a thermal treatment, possesses a problem in that the active substance experiences enhanced polarization because it is covered with the binder.

On the other hand, a number of substances possessing a self-film-forming property are utilized in an electrode for a primary battery. For example, it has been proposed to use the substance $MnO_2$ resulting from the thermal decomposition of a maganese salt in electrodes in the field of primary batteries to cover the surface of binder particles of the electrode with the thermal decomposition product $MnO_2$ (Japanese Laid-open Patent Publication No. 58821/1977); to cover the surface of carbon particles with the thermal decomposition product $MnO_2$ (Japanese Laid-open Patent Publication No. 71628/1977); and to cover the surface of the individual particles of $MnO_2$ powder with the thermal decomposition product $MnO_2$ ($\beta$ type) (Japanese Patent Publication No. 216/1977). In these proposals, it is reported to have exhibited an outstanding property as the electrode for primary battery.

SUMMARY OF THE INVENTION

An object of this invention is to provide an ECD which is inexpensive, highly stable, and free from the various disadvantage of the conventional ECD. More specifically, this invention aims to provide an ECD having a counter-electrode which is easy to manufacture, suffers little polarization, and provides stable equilibrium potential. This invention is characterized by using as the active substance for the counter-electrode a material possessed of a self-film-forming property, adopting as the material for the current collector of the counter-electrode an electroconductive substance such as graphite powder, and therefore enabling the counter-electrode to be formed without using any binder. This preclusion of the use of a binder is believed to bring about the effect of increasing the available surface area of the counter-electrode and decreasing the polarization.

DETAILED DESCRIPTION OF THE PREFERRED EMBODIMENT

Figure 6:
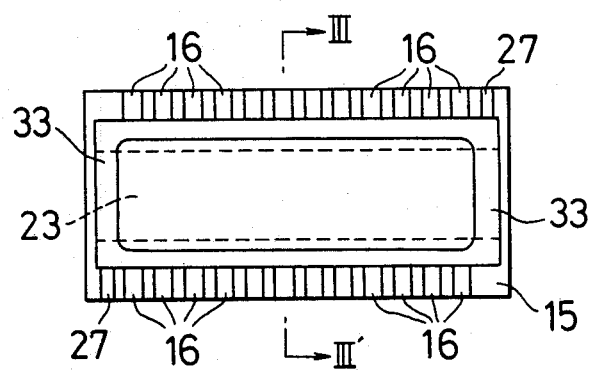
FIG. 6 is a model diagram illustrating a concrete example of the electrochromic display device according to this invention.
Figure 7:
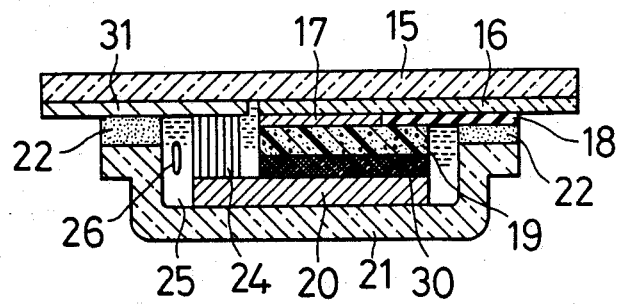
FIG. 7 is a sectional view of the electrochromic display device of this invention as taken along the III—III' line of the diagram of FIG. 5.

Referring to FIG. 6 and FIG. 7, on a transparent glass substrate 15, a transparent electrode 16 is formed by evaporation. This electrode 16 is made of such a material as indium oxide or tin oxide. An electrochromic layer 17 is formed of a tungsten oxide ($WO_3$) film which is formed on the transparent electrode 16 by evaporation. This electrochromic layer 17 corresponds to all the segments which compose the characters to be displayed by the ECD. On the remaining part of the electrode 16, an insulating film 18 is formed. This insulating film 18 is formed of such a material as sillicon oxide or aluminum oxide. A porous plate 19 is disposed to cover the electrochromic layer 17. The porous plate 19 is white so as to form a good background on which the electrochromic substance layer 17 generates its color, and it is made of such an electrically insulating substance as ceramic or fluorine resin. On the porous plate 19, a counter-electrode 20 containing a redox layer formed by burning a material consisting of a self-film-forming compound and a carbon type electroconductive substance and including substantially no binder is disposed opposite the electrochromic layer 17. A cap-shaped glass substrate 21 provided with a flange 33 is fastened on the glass substrate 15 by means of an adhesive agent 22. The two glass substrates 15, 21 cooperate to form an airtight inner space. Further on the glass substrate 15, a power feed conductor 31 is formed. The contact terminals of this conductor are disposed as extended into the inner space enclosed with the glass substrates 15, 21. An electroconductive, elastic member 24 is interposed between the conductor 31 and the counter-electrode 20. In this manner, the counter-electrode 20 and the conductor 31 are electrically connected with each other through the medium of the electroconductive, elastic member 24. An impregnation layer 30 is interposed between the counter-electrode and the porous plate 19 so as to prevent the bubble 26 from freely moving between the electrode 20 and the porous plate 19 and consequently degrading the phenomenon of display. Moreover, since the impregnated layer 30 manifests a resilient force in the direction of its thickness, it serves an additional purpose of preventing the electrode 20 and the porous plate 19 from producing relative movement. Examples of the materials advantageously usable for the impregnation layer 30 are asbestos, filter of glass fibers, polyflon filter paper, nonwoven fabrics and mats of polypropylene and other olefinic polymers, and microporous rubber sheets.

Figure 1:
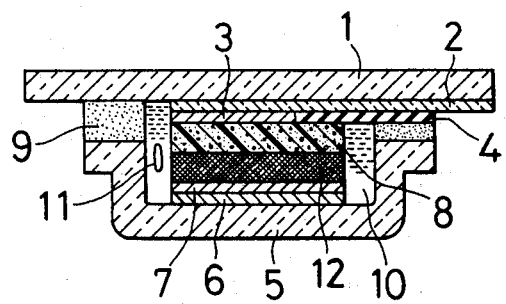
FIG. 1 is a sectional view of one example of the conventional electrochromic display device.
Figure 2:
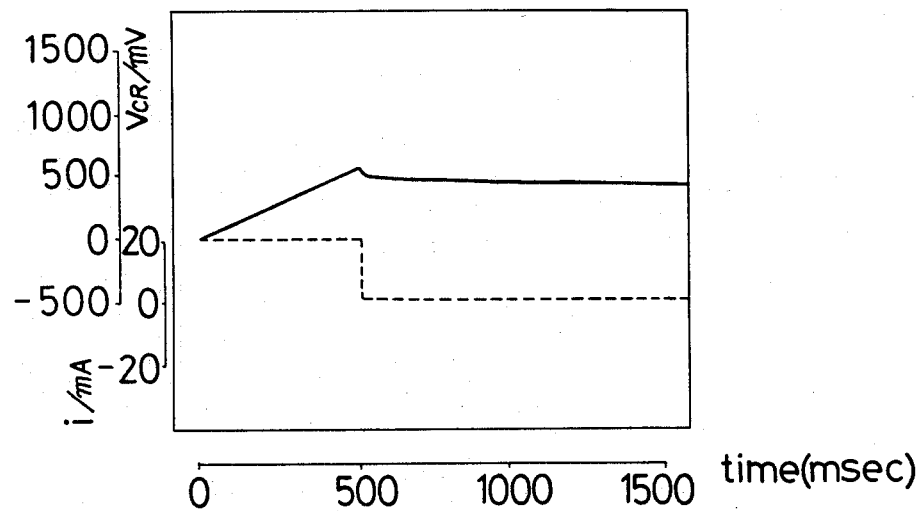
FIG. 2 and FIG. 4 are graphs showing typical changes in the potential of the counter-electrode during its write operation in the conventional electrochromic display device using colored $WO_3$ as the active substance for the counter-electrode.
Figure 3:
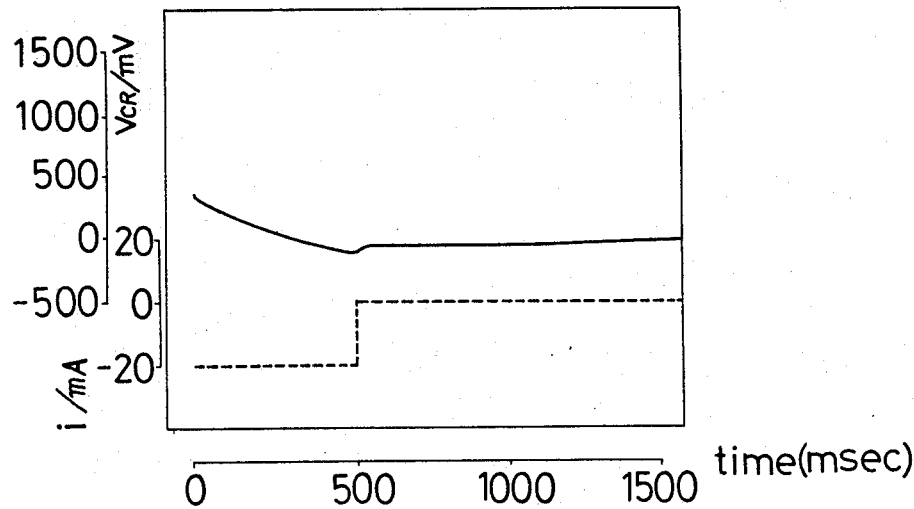
FIG. 3 and FIG. 5 are graphs showing typical changes in the potential of the counter-electrode during its erase operation in the conventional electrochromic display device involved in FIG. 2 and FIG. 4.
Figure 4:
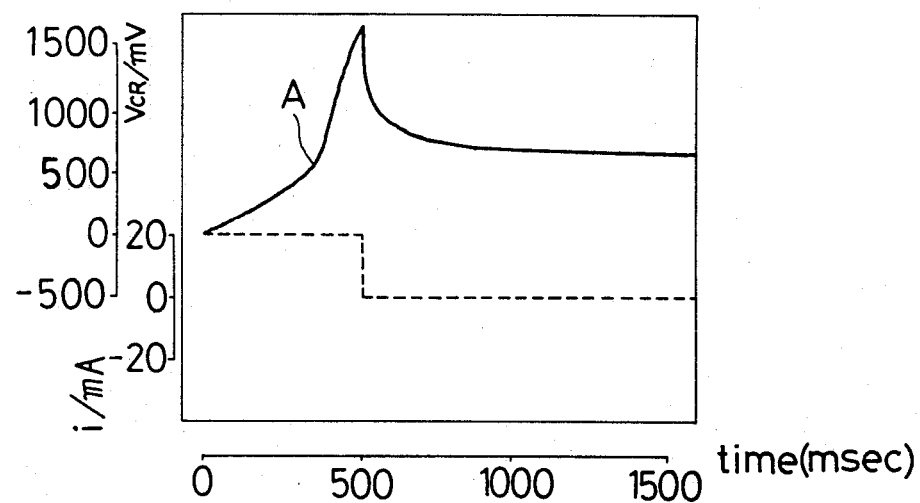
Figure 5:
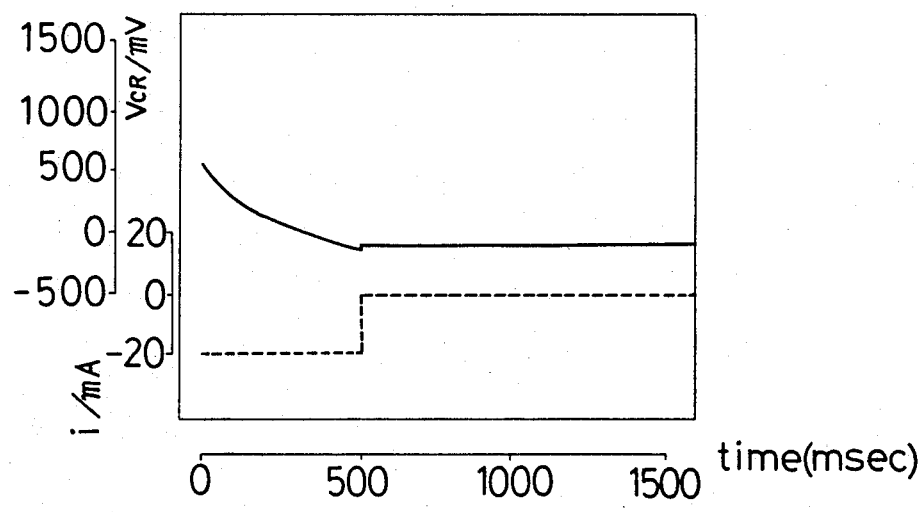

The structure itself of the ECD contemplated by this invention is not specifically limited to that which has been described above. Fundamentally, the essential requirement is that the redox layer of the counter-electrode in the ECD should be formed by burning a material consisting of a film-forming compound and a carbon type electroconductive substance and including substantially no binder. So far as this requirement is satisfied, the ECD of this invention may be in a structure similar to the typical structure of the conventional ECD illustrated in FIG. 1.

The self-film-forming compounds advantageously usable for this invention include manganese compounds, titanium compounds, niobium compounds, and vanadium compounds. Concrete examples of manganese compounds are manganese nitrate, manganese carbonate (requiring a suitable oxidizing agent such as lithium perchlorate), manganese sulfate and manganese chloride. Among these manganese compounds, manganese nitrate is a preferred choice. Concrete examples of titanium compounds are titanium halides, such as titanium chloride, or organic titanium compounds including alkoxy titanium and aryl titanium such as tetraisopropoxy titanium and tetrabutoxy titanium. Among these titanium compounds, alkoxy titaniums are preferred choices. Concrete examples of vanadium compounds are organic vanadium compounds including alkoxy vanadium such as trimethoxy vanadium, triethoxy vanadium or tributoxy vanadium as well as inorganic vanadium salts such as vanadium chloride, vanadium sulfate, and ammonium vanadate. Concrete examples of niobium compounds are organic niobium compounds such as alkoxy niobium (e.g., pentaisopropoxy niobium or pentabutoxy niobium) as well as inorganic niobium salts (e.g., niobium chloride and ammonium niobate). For use in this invention, the aforementioned organic metal compounds may be in the form of their respective hydrolyzates. They can be effectively used as self-film-forming compounds. When these compounds are dissolved in anhydrous alcohols, ketones, cellosolve, or carbitols, for example, they can be applied as prevented from further hydrolysis.

Examples of the carbon type electroconductive substances suitable for use in this invention are carbon powder, graphite powder, and non-woven fabric of carbon fibers.

The self-film-forming compound and the carbon type electroconductive substance described above may be in any form so far as they contain substantially no binder. When the electroconductive substance is used in a powdery form, it is generally appropriate to form a mixture by adding this powdery electroconductive substance to the self-film-forming compound prepared in advance in the form of a solution or to form a paste by further adding a tackifier to the mixture. In the preparation of the solution of the self-film-forming compound, no special limit is imposed on solvents usable therefor. Generally, water, alcohols, carbitols, cellosolves, and ketones prove effectively usable. Because of simplicity of handling, water proves preferable over those enumerated above. Examples of the tackifier usable in the preparation of the paste include nitrocellulose, ethyl cellulose, cellosolve acetate, glycerine as well as water-soluble high-molecular substances such as, for example, polyacrylamide and polyvinyl alcohol. Also when the carbon type electroconductive substance is used in the form of a non-woven fabric, the self-film-forming compound may be prepared in advance in the form of a solution or paste as described so that the non-woven fabric will be impregnated with the solution or paste.

The redox layer of the counter-electrode of the present invention is formed by burning the material which comprises the self-film-forming compound and the carbon type electroconductive substance. Generally, the burning of the material is effected advantageously at temperatures falling in the range of from about 250° C. to about 550° C. Especially when a manganese compound is used in the material, the burning effected at temperatures in the range of from about 400° C. to about 500° C. proved desirable because, in this temperature range, the manganese compound produces $\beta$-type $MnO_2$ which contributes to further lowering the polarization resistance.

Further, upon burning, alkoxy titanium, alkoxy vanadium and alkoxy niobium for example will be changed into $TiO_{2-x}$, $V_2O_{5-x}$ and $Nb_2O_{5-x}$, respectively.

To be specific, the counter-electrode of the present invention can be obtained by spreading on a given substrate the mixture of the solution of the self-film-forming compound and the finely divided electroconductive substance and subjecting the resultant composite to the burning described above. Otherwise, it can be formed by first applying the solution of the self-film-forming compound to the given substrate, then depositing thereon the carbon type electroconductive substance in the form of a non-woven fabric, or depositing on the given substrate the electroconductive substance in the form of a non-woven fabric impregnated in advance with the solution of the film-forming compound, and subsequently subjecting the resultant composite to the burning described above.

Now, the present invention will be described more specifically below with reference to working examples illustrating procedures for the manufacture of the counter-electrode.

EXAMPLE 1

A 50% aqueous manganese nitrate ($Mn(NO_3)_2 \cdot 6H_2O$ produced by Kishida Chemical, Osaka, Japan) solution was spread on a concave glass substrate 21 as with a brush. A piece of non-woven fabric of carbon fibers (product of Toray Ltd., marketed under a trademark of TORAYKA®mat. B0030) cut to a size fit for a counter-electrode 20 was set in position on the concave glass substrate. Consequently, the aqueous manganese nitrate solution seeped into the non-woven fabric of carbon fibers until impregnation occurred. The substrate thus coated was held at 100° C. for 20 minutes to dry the coat and, thereafter, held at 400° C. for one hour in an electric furnace to burn the coat. The composite film of MnO$_2$ and carbon thus obtained on the substrate was a MnO$_2$ electrode having a surface resistance of about 1Ω/□. The MnO$_2$ was found to consist of β-type crystals. By using this MnO$_2$ and another electrode, an ECD cell was produced by the procedure described above.

Figure 8:
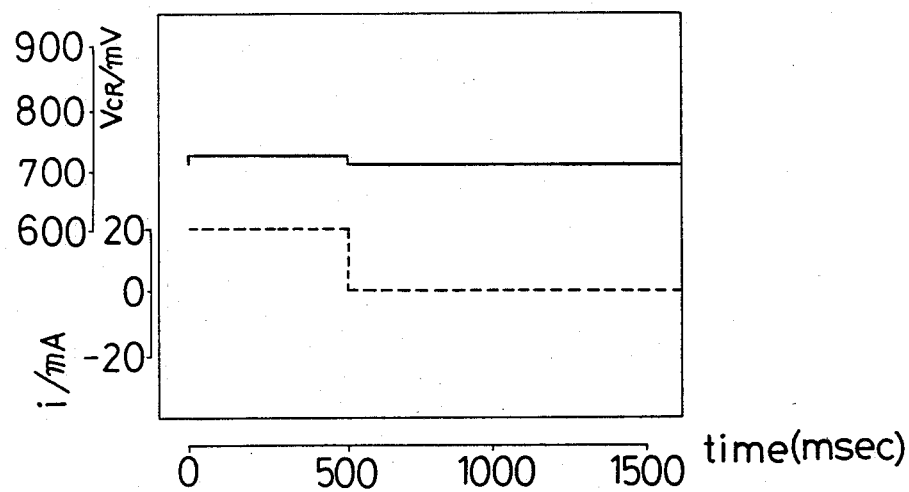
FIG. 8 is a graph showing typical changes in the potential of the counter-electrode during the write operation in the ECD according to the present invention.
Figure 9:
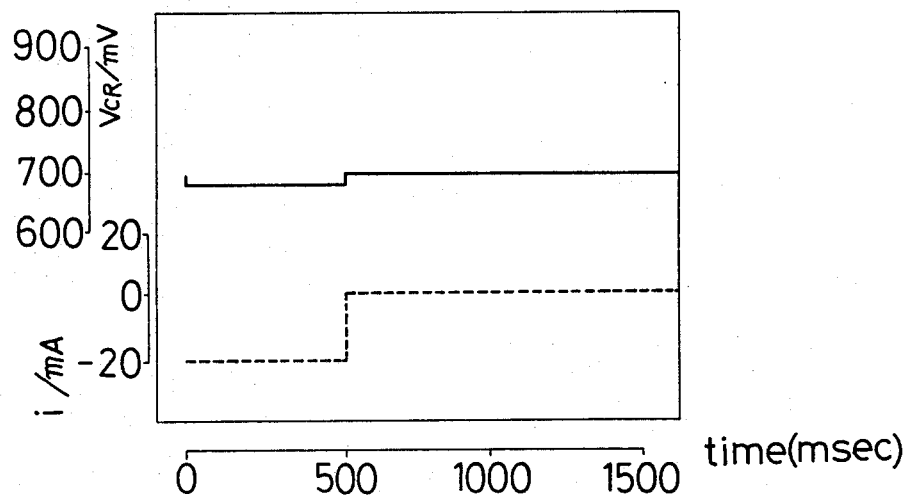
FIG. 9 is a graph showing typical changes in the potential of the counter-electrode during its erase operation in the ECD of the present invention.

The ECD cell incorporating the MnO$_2$ counter-electrode produced as described above was subjected to an experiment wherein the counter-electrode was tested for time-course change of potential due to passage of a fixed current 20 mA/cell for 0.5 second or application of an electric charge 10 mC/cell. In this case, the display electrode had a surface area of 1.5 cm$^2$ and the counter-electrode (redox layer) had a surface area of 10 cm$^2$. The results were as shown in FIG. 8 for the write operation and FIG. 9 for the erase operation. It is noted from the graphs that the change of potential, ΔE, the MnO$_2$ electrode of this invention exhibited between the application and release of an electric charge of 1 mC/cm$^2$ was 10 mV and the overvoltage, n, exhibited thereby for the passage of a current of 2 mA/cm$^2$ was about 20 mV, indicating that the MnO$_2$ electrode possessed excellent properties. When this cell was allowed to stand at 70° C. for 1000 hours, virtually no change was observed in its properties before and after the standing. As described above, the MnO$_2$ electrode of this invention exhibits outstanding properties as the counter-electrode for the WO$_3$ ECD.

EXAMPLE 2

A homogeneous paste was prepared by intimately mixing the same aqueous manganese nitrate solution as used in Example 1 with acetylene black powder (made by Ibigawa Denko Co., Ltd.) in a volume ratio of 1:1. This paste was spread on a concave glass substrate. The subsequent procedure was followed to as Example 1. The counter-electrode subsequently obtained exhibited outstanding properties similar to the properties of the counter-electrode obtained in Example 1. The electroconductive acetylene black powder used herein could be replaced by any carbon powder available for the purpose of this invention. The particle diameter of such a carbon powder was desired to be as small as possible (preferably in the range of from 0.3 to 1 μm) to ensure great ease with which the carbon powder could not be converted into a paste. By the same procedure, a counter-electrode was obtained by using a paste which had been prepared by dissolving 1 part by weight of manganese nitrate in 1 part by weight of dibutyl carbitol containing 1 to 5% by weight of ethyl cellulose and intimately mixing the resultant solution with carbon powder in a volume ratio of 1:1. The counter-electrode thus produced exhibited outstanding properties comparable with the properties of the counter-electrode described above. It is noteworthy that the paste prepared by using the tackifier and the solvent was especially fit for the screen printing process.

EXAMPLE 3

A solution of tetraisopropoxy titanium [Ti(OC$_3$H$_4$-iso)$_4$] (produced by Kojundo-Kagaku Co., Ltd., Tokyo, Japan) (50 wt%) in isopropyl alcohol was spread on a concave glass substrate and allowed to seep into a non-woven fabric of carbon fibers (TORAYKA®mat) which had been deposited in advance on the glass substrate. By subjecting the composite thus produced to a heat treatment at 400° C. for one hour, there was obtained a TiO$_{2-x}$ electrode. The counter-electrode thus obtained exhibited outstanding properties particularly suitable for the ECD.

EXAMPLE 4

By following the procedure of Example 3, a counter-electrode was obtained by using a solution of triethoxy vanadium [V(OC$_2$H$_5$)$_3$] (produced by Kojundo-Kagaku Co., Ltd.) (50 wt%) in isopropyl alcohol and an ECD cell was completed by incorporating this counter-electrode. Even after various enviromental tests (such as, for example, a test for durability at 70° C. for 1000 hours and a cycle test at temperatures from −20° C. to +70° C.), the ECD cell operated under a fixed voltage (±1.5 V) for a fixed time (0.5 second) showed no change in color evenness and image contrast.

The counter-electrode obtained by the simple procedures of coating and burning as described above exhibited outstanding properties particularly suitable for ECD's, satisfying such requirements that (1) the counter-electrode should be capable of passing an electric charge of 10 mC/cm$^2$ in both directions of oxidation and reduction within 0.5 second and should restrain polarization to within 0.1 V during the passage of the current; and (2) the counter-electrode should exert no chemical effect upon the electrochromic substance in the display electrode. The counter-electrodes of the present invention permit manufacture of inexpensive ECD's capable of being operated by a simple method (such as by application of a fixed voltage for a fixed length of time).

The active substance for the counter-electrode can be applied by brushing, screen printing, or transfer printing, for example.

What we claim is:

1. An electrochromic display device having an electrolyte a display electrode formed of an electrochromic substance and a counter-electrode therefor in which a redox layer of said counter-electrode is formed from a burnt material comprising a self-film-forming compound and a carbonaceous electroconductive substance and including substantially no binder.

2. A display device as claimed in claim 1, in which the self-film-forming compound is selected from the group consisting of a manganese compound, a titanium compound, a niobium compound or a vanadium compound.

3. A display device as claimed in claim 2, in which the manganese compound is an inorganic manganese salt.

4. A display device as claimed in claim 2, in which the titanium compound is an inorganic titanium salt compound or an organic alkoxy titanium.

5. A display device as claimed in claim 2, in which the niobium compound is an inorganic niobium salt or an organic alkoxy niobium compound.

6. A display device as claimed in claim 2, in which the vanadium compound is an inorganic vanadium salt or an organic alkoxy vanadium compound.

7. A display device as claimed in claim 1, in which the carbonaceous electroconductive substance is carbon powder, graphite powder or a non-woven fabric of carbon fibers.

8. A display device as claimed in claim 1, in which the burnt material is formed at 250° C.–550° C.

9. A display device as claimed in claim 8, in which the burnt material is formed at 400° C.–500° C.

10. A display device as claimed in claim 1, in which an aqueous solution of manganese nitrate as the self-film-forming compound is used and the burnt material is formed at 400° C.–500° C.

11. A display device as claimed in claim 1, in which the redox layer is formed by applying on a substrate of the counter-electrode a mixture of a solution of the self-film-forming compound and a powder of the carbonaceous electroconductive material and then burning the resulting mixture.

12. A display device as claimed in claim 1, in which the redox layer is formed by applying a solution of the self-film-forming compound on a substrate of the counter-electrode and then setting on it non-woven fabric of carbon fibers as the carbonaceous electroconductive substance, and then burning the resultant.

13. A display device as claimed in claim 1, in which the redox layer is formed by impregnating a non-woven fabric of carbon fibers with the self-film-forming compound, applying said impregnated non-woven fabric of carbon fibers on a substrate of the counter-electrode, and then burning the resultant.

14. A display device as claimed in claim 3, in which the manganese compound is selected from the group consisting of manganese nitrate, manganese carbonate, manganese sulfate, and manganese chloride.

15. A display device as claimed in claim 4, in which the inorganic titanium salt is titanium chloride.

16. A display device as claimed in claim 4, in which the organic alkoxy titanium compound is tetraisopropoxy titanium or tetrabutoxy titanium.

17. A display device as claimed in claim 5, in which the inorganic niobium salt is niobium chloride or ammonium niobate.

18. A display device as claimed in claim 5, in which the organic alkoxy niobium compound is pentaisopropoxy niobium or pentabutoxy niobium.

19. A display device as claimed in claim 6, in which the inorganic vanadium salt is selected from the group consisting of vanadium chloride, vanadium sulfate, and ammonium vanadate.

20. A display device as claimed in claim 6, in which the organic alkoxy vanadium compound is selected from the group consisting of trimethoxy vanadium, triethoxy vanadium, and tributoxy vanadium.

* * * * *